United States Patent [19]

Ozawa et al.

[11] Patent Number: 5,190,205
[45] Date of Patent: Mar. 2, 1993

[54] BONDING HEAD ASSEMBLY

[75] Inventors: Kanji Ozawa; Yukitaka Sonoda, both of Tokyo, Japan

[73] Assignee: Kabushiki Kaisha Shinkawa, Tokyo, Japan

[21] Appl. No.: 785,494

[22] Filed: Oct. 31, 1991

[30] Foreign Application Priority Data

Oct. 31, 1990 [JP] Japan ................................. 2-295089

[51] Int. Cl.⁵ .......................... B23K 3/00; B23K 20/02
[52] U.S. Cl. .................................... 228/44.7; 228/45; 228/55
[58] Field of Search ................. 228/44.7, 44.3, 45, 228/51, 55, 212, 180.2

[56] References Cited

U.S. PATENT DOCUMENTS 4,875,614 10/1989 Cipolla et al. .................. 228/44.7
4,982,890 1/1991 Schuster et al. ................ 228/44.7

FOREIGN PATENT DOCUMENTS 63-169730 7/1988 Japan .
63-169731 7/1988 Japan .
232345 9/1988 Japan ........................... 228/180.2
425516 3/1935 United Kingdom ............... 228/55

Primary Examiner—Samuel M. Heinrich
Attorney, Agent, or Firm—Koda and Androlia

[57] ABSTRACT

A bonding head assembly including a retaining block having a vacuum suction hole or electromagnet on its concave surface formed on the undersurface, a central shaft loosely passing through the central hole of the retaining block and having a bonding tool at the lower end, an oscillating ball attached to the upper part of the central shaft. After the bonding tool is brought into in contact with a workpiece, vacuum suction or electromagnet is activated so that the oscillating ball is brought into a tight contact with the concave surface of the retaining block, thus securely retaining the oscillating ball in the retaining block and, as a result, setting the position of the central shaft and therefore the bonding tool.

5 Claims, 1 Drawing Sheet

BONDING HEAD ASSEMBLY

BACKGROUND OF THE INVENTION

1. Filed of the Invention

The present invention relates to a bonding head which is used in inner lead bonders, bump transfer bonders, pellet bonders, etc., and more particularly to a tool-holding mechanism for such bonders.

2. Prior Art

In bonders, it is desirable that the entire undersurface of the bonding tool make a uniform contact with the bonding surface of a workpiece upon which the bonding is performed.

One type of conventional bonding tool holder is equipped with an automatic following mechanism that guides the bonding tool to follow the surface configuration of the workpiece. This mechanism is disclosed in, for example, Japanese Patent Application Laid-Open (Kokai) Nos. 63-169730 and 63-169731.

The following mechanisms in these prior art use springs that connect a tool holder, to which a bonding tool is mounted, and a tool attachment which is fastened to the tool-holder of a bonder. Accordingly, when the bonding tool is pressed against the workpiece, the springs bend and the undersurface of the bonding tool conforms to the bonding surface of the workpiece.

In these prior art, the bonding tool is, via springs, pressed against leads of the workpiece which has elasticity. Accordingly, slipping may occur when the tool is pressed against the leads, and there is a deterioration in the bonding precision and bondability.

SUMMARY OF THE INVENTION

Accordingly, the primary object of the present invention is to provide a bonding head that has a tool-holding mechanism which is able to adjust the bonding tool in a short period of time so that the undersurface of the bonding tool is set to be parallel to the surface of the workpiece and which is able to prevent improper pressing contact.

The object of the present invention is accomplished by a unique structure which includes: a central shaft to which a bonding tool is mounted; an oscillating element which is attached to the central shaft; an oscillating element retaining block which retains the oscillating element in a manner that the oscillating element can oscillate; and a retaining means which securely holds the oscillating element in the retaining block by means of vacuum suction adhesion or electromagnets.

With such a structure, if the vacuum suction of the retaining means is switched off (or when the electromagnets of the retaining means are switched off), the oscillating element becomes free to oscillate in any direction in the oscillating element retaining block. As a result, when the undersurface of the bonding tool, which is mounted to the oscillating element via the central shaft, comes into contact with a bonding stage, the undersurface of the bonding tool can conform to the surface of the bonding stage. Under this state, the vacuum suction of the retaining means is switched on (or the electromagnets of the retaining means are switched on), causing the oscillating element to be securely retained in the oscillating element retaining block.

Thus, a parallel alignment of the undersurface of the bonding tool can be accomplished by first causing the bonding tool to contact the bonding stage and then switching on the vacuum or electromagnets. Thus, the operation of obtaining parallel alignment between the bonding tool and workpiece is very easy.

DETAILED DESCRIPTION OF THE INVENTION

Figure 1:
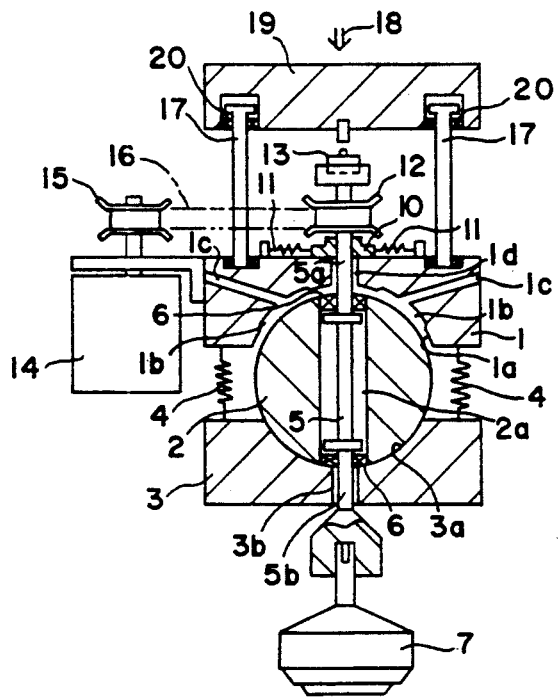
FIG. 1 is a cross sectional view illustrating one embodiment of the bonding head assembly according to the present invention.
Figure 2:
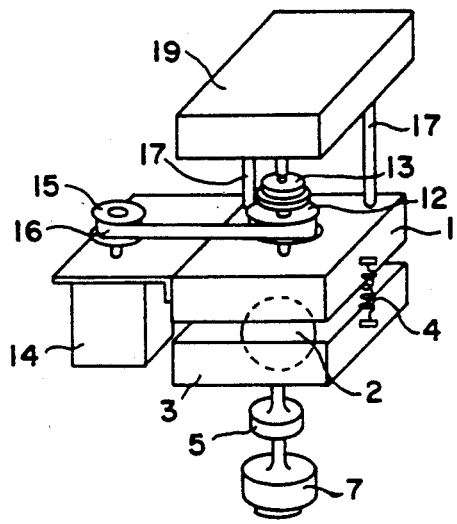
FIG. 2 is a schematic external view of the embodiment shown in FIG. 1.

One embodiment of the present invention will be described below with reference to FIGS. 1 and 2.

Reference numeral 1 is a retaining block for an oscillating element or oscillating ball 2. The oscillating element 2 is installed on the undersurface of the oscillating element retaining block 1 which is movable up and down by a vertical driving means (not shown). An oscillating element holder 3 is installed on the undersurface of the oscillating element 2. The holder 3 is suspended from the retaining block 1 by means of springs 4.

The oscillating element 2 is a ball having a spherical surface, and indentations 1a and 3a with concave spherical surfaces both having the same radius as the oscillating assembly 2 are formed on the undersurface of the retaining block 1 and the upper surface of the holder 3, respectively. These concave surfaces can snugly contact the convex surface of the oscillating assembly 2. Ring-shaped suction adhesion ports 1b are formed in the spherical-surface indentation 1a, and suction adhesion holes 1c which open into each of the suction adhesion ports 1b are formed in the retaining block 1. To each of the suction adhesion holes 1c, vacuum suction is applied by a vacuum means (not shown).

Shaft guide holes 1d, 2a and 3b in which a central shaft 5 is inserted are formed on the same vertical axis in the retaining block 1, oscillating assembly 2 and holder 3, respectively. The central shaft 5 is supported in the oscillating assembly 2 via bearings 6 so that the central shaft 5 is rotatable in the guide hole 2a. The top end 5a and the bottom end 5b of the central shaft 5 each passing through the retaining block 1 and holder 3 have a smaller diameter than the corresponding guide holes 1d and 3b. Thus, the central shaft 5 can make a slight inclination in any direction. A bonding tool 7 is attached to the lower end of the central shaft 5.

A spring attachment 10 is fit over the top end 5a of the central shaft 5 so that it is on the upper surface of the retaining block 1. The spring attachment 10 is free to rotate and to move up and down on the central shaft 5. Each of the springs 11 is fastened at one end to the retaining block 1 and at the other end to the spring attachment 10. The central shaft 5 is maintained in a more or less vertical position by these springs 11.

A pulley 12 is attached to the central shaft 5 so that the pulley is positioned above the spring attachment 10. The upper end of the central shaft 5 is fixed with a load cell 13.

A motor 14 that makes a rotary adjustment of the bonding tool is mounted on the side of the retaining block 1. A pulley 15 is attached to the output shaft of the motor 14, and a belt 16 is installed between the pulley 15 and the pulley 12 which is on the central shaft 5.

Guide rods 17 are installed vertically on the upper surface of the retaining block 1. A pressure application block 19, to which pressure is applied as indicated by arrow 18 via a pressure means which is not shown in the drawings, is provided on the upper ends of the guide rods 17 via bearings 20. The pressure application block 19 is thus movable up and down.

A method of accomplishing a parallel alignment of the undersurface of the bonding tool 7 will be described below.

Before the adjustment operation starts, the vacuum suction applied to the suction adhesion holes 1c is "off". In this state, the central shaft 5 is kept more or less in a vertical position by the springs 11. Thus, the central shaft 5 and therefore the bonding tool 7 are in a "free state", which means that the central shaft 5 and the bonding tool 7 can swing or incline in any direction. Keeping this "free state," the retaining block 1 is lowered so that the undersurface of the bonding tool 7 comes into contact with a bonding stage (not shown). Because of the looseness of the oscillating assembly 2 between the retaining block 1 and the holder 3, the undersurface of the bonding tool 7 by itself can conform to the bonding stage.

As a result, the upper surface of the oscillating assembly 2 is in tight contact with the spherical-surface indentation 1a of the retaining block 1. Then, vacuum suction that is to be applied to the suction adhesion holes 1c is activated. This causes the oscillating element 2 to be sucked by and retained in the retaining block 1 by the vacuum suction adhesion. In other words, the bonding tool 7 at the end of the central shaft 5 is fixed in position as set and aligned as described above.

As seen from the above, the oscillating assembly 2 to which the central shaft 5 is attached is provided in the retaining block 1 via a mechanism that can make an oscillation motion. Thus, the oscillating assembly 2 can oscillate relative to the retaining block 1. As a result, the undersurface of the bonding tool 7 can move in any desired direction.

Accordingly, a parallel alignment of the bonding tool 7 can be accomplished by first causing the undersurface of the bonding tool 7 to contact the bonding stage and then switching on the vacuum suction to be applied to the suction adhesion holes 1c after the oscillating assembly 2 has come into a tight contact with the retaining block 1. Thus, the adjustment operation is easily done in a short period of time.

After the parallel alignment of the bonding tool 7 has been accomplished, the motor 14 is rotated so that the position of the bonding tool 7 in the theta ($\theta$) direction is adjusted. More specifically, when the motor 14 is toward, the central shaft 5 and the bonding tool 7 are also rotated via the pulley 15, belt 16 and pulley 12. The position of the bonding tool in the theta ($\theta$) direction is thus adjusted.

Bonding load with which the bonding tool 7 presses against the workpiece is set by the use of the load cell 13. More specifically, the bonding load is provided by applying a pressure as indicated by arrow 18 to the pressure application block 19 by a means which is not shown in the drawings, thus pushing down the pressure application block 19 along the guide rods 17. As a result, the pressure is applied to the central shaft 5 and therefore to the bonding tool 7 via the load cell 13. The load in this case is detected by the load cell 13 and the bonding load is set accordingly.

Figure 3:
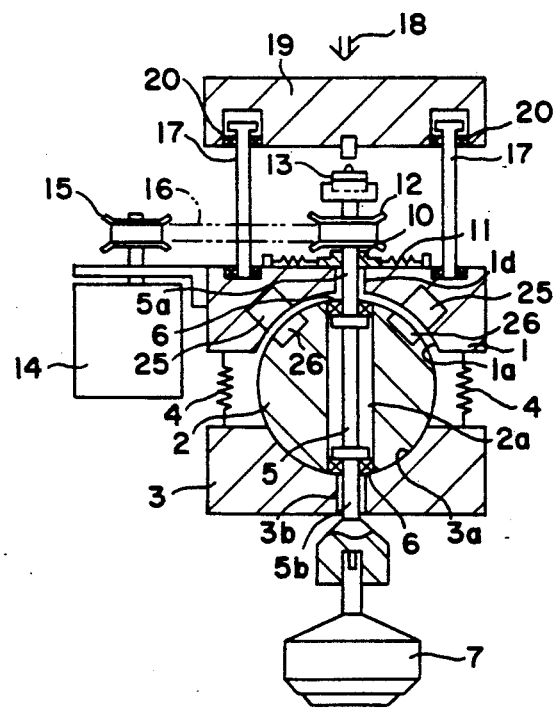
FIG. 3 is a cross sectional view which illustrates another embodiment of the present invention.

FIG. 3 shows another embodiment of the present invention. In this embodiment, electromagnets are used. The electromagnets 25 are installed in the spherical-surface indentation 1a formed in the oscillating element retaining block 1. Magnetic plates 26 (iron plates, etc.) are attached to the surface of the oscillating assembly 2. Accordingly, when the electromagnets 25 are activated, the oscillating assembly 2 is retained by the retaining block 1. When the electromagnets 25 are switched off, the oscillating assembly 2 is back to the state to freely oscillate. This embodiment has the same effect and advantages as the first embodiment that uses vacuum suction.

Figure 4:
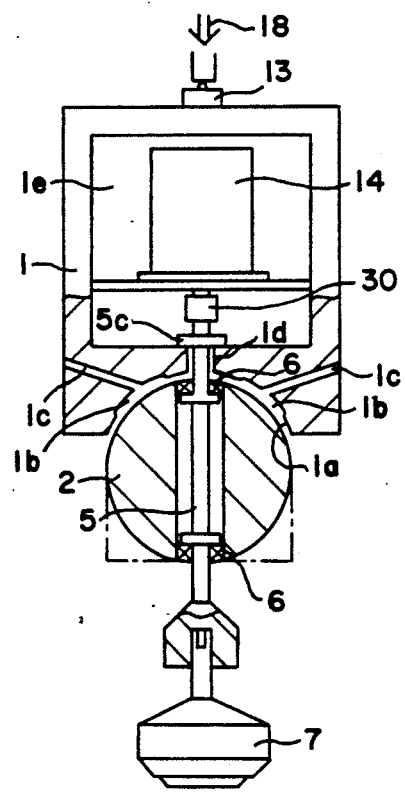
FIG. 4 is a cross sectional view which illustrates still another embodiment of the present invention.

FIG. 4 shows still another embodiment of the present invention. In the embodiments described in FIGS. 1 through 3, the rotation of the motor 14 is transmitted to the central shaft 5 via the pulley 15, belt 16 and pulley 12, thus adjusting the rotation of the bonding tool. In this embodiment shown in FIG. 4, however, the motor 14 that is for a rotary adjustment of the tool is directly connected to the central shaft 5 via a coupling 30.

It is preferable, in this embodiment, to use a coupling that has a spring structure capable of absorbing the upward and downward motion of the central shaft 5. Also in this embodiment, the load cell 13 is mounted on the upper surface of the retaining block 1. The thus structured device has the same effect as in the devices shown in FIGS. 1 through 3.

Reference numeral 5c is a disc secured to the central shaft 5. The disc 5c contacts the edge of a window 1e provided in the bottom of the retaining block 1. Because of this disc 5c secured to the central shaft 5, the springs 4 and holder 3 shown in FIGS. 1 through 3 are both eliminated. In this case, the undersurface of the oscillating assembly 2 does not need to be spherical. The oscillating element 2 can be cylindrical as indicated by the two-dot line in FIG. 4 with only the top portion thereof spherically shaped.

The device of FIG. 4 is drawn so that vacuum suction adhesion is used to retain the oscillating assembly 2 in the retaining block 1. However, it goes without saying that electromagnets 25 and magnetic plates 26 that are shown in FIG. 3 can also be used.

In all of the embodiments described above, adjustment of the position of the bonding tool 7 in the theta ($\theta$) direction is accomplished by means of the motor 14. However, if a workpiece holder that carries the workpieces has a rotary mechanism, the motor 14 that is used for rotary adjustment of the tool can be omitted and the central shaft 5 is formed as an integral single element with the oscillating element 2.

In the present invention, as is clear from the above description, a parallel alignment of the undersurface of the bonding tool relative to a workpiece is accomplished by bringing the bonding tool into contact with the bonding stage and then switching on vacuum suction or electromagnets to positionally set the central shaft that has the bonding tool. Accordingly, the adjustment operation is easy and can be accomplished very quickly. Furthermore, since no slipping occurs between the bonding tool and the workpieces when the bonding tool comes into contact with the workpieces, there is no danger of improper contact.

We claim:

1. A bonding head which is equipped with: a central shaft to which a bonding tool is mounted, an oscillating element which is attached to said central shaft, an oscillating element retaining block which retains aid oscillating element in a manner that said oscillating element is free to oscillate, and a retaining means which retains said oscillating element in said oscillating element retaining block, said retaining means being a vacuum suction retaining means.

2. A bonding head which is equipped with: a central shaft to which a bonding tool is mounted, an oscillating element which is attached to said central shaft, an oscillating element retaining block which retains said oscillating element in a manner that said oscillating element is free to oscillate, and a retaining means which retains said oscillating element in said oscillating element retaining block, said retaining means being an electromagnetic retaining means.

3. A bonding head assembly comprising:
a retaining block having a concave surface on its undersurface and a central hole;
a central shaft with a bonding tool mounted at one end, said central shaft being passed through said central hole of said retaining block;
an oscillating element which is attached to said central shaft, said oscillating element having a convex surface on its upper surface so as to conform with said concave surface of said retaining block; and
a retaining means for retaining said oscillating element in said retaining block by bringing said convex surface of said oscillating element into contact with said concave surface of said retaining block.

4. A bonding head assembly according to claim 3, wherein said retaining means is a vacuum suction retaining means comprising at least one suction hole provided in said retaining block with one end thereof opened to said concave surface and at least one suction adhesion port provided on said concave surface of said oscillating assembly, thus bringing said oscillating element into contact with said concave surface of said retaining block upon creation of vacuum in said suction hole and suction adhesion port.

5. A bonding head according to claim 3, wherein said retaining mean is an electromagnetic retaining means comprising at least one electromagnet installed in said concave surface of said retaining block and at least one metal plate provided on said convex surface of said oscillating element, thus bringing said oscillating element into contact with said concave surface of said retaining block upon activation of said electromagnet.

* * * * *